United States Patent
Liu et al.

(10) Patent No.: US 8,737,281 B2
(45) Date of Patent: May 27, 2014

(54) APPARATUS FOR MULTICAST TRANSMISSIONS IN WIRELESS LOCAL AREA NETWORKS

(75) Inventors: Hang Liu, Yardley, PA (US); Ishan Mandrekar, Monmouth Junction, NJ (US); Minquan Wu, Princeton Junction, NJ (US); Ramkumar Perumanam, Edison, NJ (US); Saurabh Mathur, Monmouth Junction, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 164 days.

(21) Appl. No.: 12/737,173

(22) PCT Filed: Jun. 27, 2008

(86) PCT No.: PCT/US2008/008073
§ 371 (c)(1),
(2), (4) Date: Dec. 14, 2010

(87) PCT Pub. No.: WO2009/154600
PCT Pub. Date: Dec. 23, 2009

(65) Prior Publication Data
US 2011/0080977 A1    Apr. 7, 2011

(30) Foreign Application Priority Data
Jun. 18, 2008   (WO) ................ PCT/US2008/007593

(51) Int. Cl.
*H04H 20/71*    (2008.01)
*H04L 12/28*    (2006.01)
*H04J 3/26*    (2006.01)
*H04L 12/43*    (2006.01)
*H04L 12/66*    (2006.01)

(52) U.S. Cl.
USPC ........... 370/312; 370/351; 370/432; 370/458; 370/463; 370/196

(58) Field of Classification Search
USPC ........ 370/310, 312, 351, 389, 390, 392, 393, 370/229, 235, 236, 241, 252
See application file for complete search history.

(56) References Cited

U.S. PATENT DOCUMENTS

| 4,760,572 A | 7/1988 | Tomikawa |
| 5,592,483 A | 1/1997 | Hieda et al. |

(Continued)

FOREIGN PATENT DOCUMENTS

| CN | 101193416 | 6/2000 |
| CN | 1943157 | 4/2007 |

(Continued)

OTHER PUBLICATIONS

Int'l Search Report, dated Apr. 22, 2009.

(Continued)

*Primary Examiner* — Omar Ghowrwal
(74) *Attorney, Agent, or Firm* — Robert D. Shedd; Jerome G. Schaefer

(57) ABSTRACT

Message formats and apparatus are described that serve to reserve access to a communication medium in a multi-cast system. A first message, a multicast request-to-send message, includes a duration field having information representing the reserved time for a communication medium, a multicast receiver address field, a multicast transmitter address field, a field that identifies the number of slots for a clear-to-send response, and a field that identifies the number slots for a not-clear-to-send response. A second message includes a duration field, and a multicast receive address field. The second message has a format that can be used as one of a clear-to-send message in response to a multicast request-to-send message, a cancel-clear-to-send message that cancels a data transmission after the clear-to-send message is sent, and a not-clear-to-send message in response to the multicast request-to-send message.

12 Claims, 13 Drawing Sheets

(56) References Cited

U.S. PATENT DOCUMENTS

| | | | |
|---|---|---|---|
| 5,901,362 | A | 5/1999 | Cheung et al. |
| 6,411,290 | B1 | 6/2002 | Sasaki |
| 7,349,349 | B2 | 3/2008 | Acharya et al. |
| 7,613,202 | B2 | 11/2009 | Doi et al. |
| 7,657,276 | B2 | 2/2010 | Sakoda |
| 7,907,627 | B2 | 3/2011 | Yang et al. |
| 8,009,596 | B2 | 8/2011 | Tomioka |
| 8,472,365 | B2 | 6/2013 | Liu et al. |
| 2002/0071448 | A1 | 6/2002 | Cervello et al. |
| 2002/0152324 | A1* | 10/2002 | Sherman ............... 709/245 |
| 2003/0153339 | A1 | 8/2003 | Crockett et al. |
| 2003/0227934 | A1 | 12/2003 | White et al. |
| 2005/0265393 | A1 | 12/2005 | Fischer et al. |
| 2006/0013179 | A1 | 1/2006 | Yamane |
| 2006/0034247 | A1 | 2/2006 | Gu et al. |
| 2006/0109859 | A1 | 5/2006 | Acharya et al. |
| 2006/0114867 | A1 | 6/2006 | Du et al. |
| 2006/0126494 | A1 | 6/2006 | Dougall et al. |
| 2006/0154603 | A1 | 7/2006 | Sachs et al. |
| 2006/0165114 | A1 | 7/2006 | Diepstraten et al. |
| 2007/0002887 | A1 | 1/2007 | Benveniste |
| 2007/0016637 | A1 | 1/2007 | Brawn et al. |
| 2007/0258466 | A1 | 11/2007 | Kakani |
| 2007/0263570 | A1* | 11/2007 | Alapuranen et al. ......... 370/337 |
| 2007/0268884 | A1 | 11/2007 | Kolavennu et al. |
| 2008/0002591 | A1 | 1/2008 | Ueno |
| 2008/0004076 | A1* | 1/2008 | Adachi et al. .............. 455/560 |
| 2008/0063106 | A1 | 3/2008 | Hahm et al. |
| 2008/0267181 | A1 | 10/2008 | Monga et al. |
| 2009/0067389 | A1* | 3/2009 | Lee et al. ............... 370/336 |
| 2009/0258603 | A1* | 10/2009 | Ghaboosi et al. ............. 455/68 |
| 2011/0310871 | A1 | 12/2011 | Fischer et al. |

FOREIGN PATENT DOCUMENTS

| | | |
|---|---|---|
| CN | 101035074 | 9/2007 |
| CN | 1652522 | 8/2008 |
| EP | 1686730 | 8/2006 |
| JP | 11196088 | 7/1999 |
| JP | 2002521864 | 7/2002 |
| JP | 2005236923 | 9/2005 |
| JP | 2006020290 | 1/2006 |
| JP | 2006060408 | 3/2006 |
| JP | 2006270914 | 10/2006 |
| JP | 2007150840 | 6/2007 |
| JP | 2007158765 | 6/2007 |
| JP | 2008017306 | 6/2008 |
| JP | 2008141372 | 6/2008 |
| RU | 2121762 | 11/1998 |
| RU | 2316146 | 1/2008 |
| RU | 74232 | 6/2008 |
| WO | WO9952077 | 10/1999 |
| WO | WO0004677 | 1/2000 |
| WO | WO03062955 | 7/2003 |
| WO | WO2004023736 | 3/2004 |
| WO | WO2005041467 | 5/2005 |
| WO | WO2005057332 | 6/2005 |
| WO | WO2006015252 | 2/2006 |
| WO | WO2006043161 | 4/2006 |
| WO | WO2006133415 | 12/2006 |
| WO | WO2007011950 | 1/2007 |
| WO | WO2007038118 | 4/2007 |
| WO | WO2007052143 | 5/2007 |
| WO | WO2007053299 | 5/2007 |
| WO | WO2007078073 | 7/2007 |
| WO | WO2007081683 | 7/2007 |
| WO | WO2007122503 | 11/2007 |
| WO | WO2008020731 | 2/2008 |

OTHER PUBLICATIONS

Tang et al., "MAC Layer Broadcast Support in 802.11 Wireless Networks", MILCOM 2000, 21st Century Military Communications Conference Proceedings, vol. 1, Oct. 22-25, 2000, pp. 544-548.

Wang et al., "Opportunistic Media Access Control and Rate Adaptation for Wireless Ad Hoc Networks", 2004 IEEE International Conference on Communications, vol. 1, Paris France, Jun. 20-24, 2004, pp. 154-158.

IEEE, "IEEE Standard for Information Technology—Telecommunications and Information Exchange Between Systems—Local and Metropolitan Area Networks—Specific Requirements", Part 11: Wireless LAN Medium Access control (MAC) New York, New York, Nov. 11, 2005.

IEEE LAN/MAN Standards Committee, "IEEE 802.11", http://en.wikipedia.org/wiki/IEEE_808.11 Jul. 11, 2012.

* cited by examiner

| FRAME CONTROL | DURATION | RA | TA | # OF MB-CTS | # OF MB-NCTS | FCS |

*FIG. 3*

| FRAME CONTROL | DURATION | RA | FCS |

*FIG. 4*

| FRAME CONTROL | DURATION | RA | FCS |

*FIG. 5A*

| FRAME CONTROL | DURATION | RA | TA | FCS |

*FIG. 5B*

| FRAME CONTROL | DURATION | RA | FCS |

APPARATUS FOR MULTICAST TRANSMISSIONS IN WIRELESS LOCAL AREA NETWORKS

REFERENCE TO RELATED APPLICATIONS

This application claims the benefit, under 35 U.S.C. §365 of International Application PCT/US2008/008073, filed Jun. 27, 2008 which was published in accordance with PCT Article 21(2) on Dec. 23, 2009 in English and which claims the benefit of PCT patent application No. PCT/US08/007,593, filed Jun. 18, 2008.

FIELD OF THE INVENTION

The present invention relates generally to wireless communication and specifically to messages and an apparatus to transmit and receive messages for reducing the collision probability for multicast in wireless local area networks.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire subset. That is, multicast may include broadcast and is therefore a broader term than broadcast as used herein. Data is transmitted in packets or frames.

In wireless local area networks, an access point (AP)/station (STA)/mobile device/mobile terminal transmits multicast and broadcast frames immediately after it determines that the wireless medium/channel is idle/clear using a physical and virtual carrier sense process with a random backoff time. Therefore, collisions may occur when multiple STAs attempt to transmit simultaneously. For example, an access point and its associated STAs may transmit simultaneously and then all the transmitted frames are lost due to collision. For example, when an AP sends multicast data frames to several of its associated STAs, another STA may send its data or control frames to the AP. The AP with its associated stations is called a basic service set (BSS). Collisions occurring within a BSS are called intra-BSS collisions. In another example, AP1 and AP2 operate on the same channel/frequency and the two BSSs overlap. AP1 transmits data frames to its associated STAs. However, AP2 cannot hear AP1's transmission and thinks that the medium is idle. AP1 is a "hidden node" to AP2. AP2 may transmit frames to its associated STAs while AP1 is transmitting. But there are STAs that are in the interference range of both AP1 and AP2 so that the transmitted frames from AP1 and AP2 are lost at the STAs due to collision. This type of collision is called overlap BSS collision or inter-BSS collision.

In one prior art scheme, a time-division multiple access (TDMA) method was described, where each STA scheduled its transmissions using TDMA time slots (time periods). However, this mechanism required synchronization among the STAs and did not scale well as the number of STAs increased. In another prior art scheme, in order to solve inter-BSS collision, each access point scheduled its multicast and broadcast transmissions in a TDMA fashion using beacons. This method also required synchronization among BSSs.

It would be advantageous to have a method and apparatus to solve intra-BSS collisions and inter-BSS collisions for multicast transmissions that did not require synchronization. The present invention solves both intra-BSS collisions and inter-BSS collisions.

SUMMARY OF THE INVENTION

The present invention is directed to a method to reserve the medium and distribute the medium reservation information for multicast and broadcast transmissions in wireless local area networks. Therefore, the collision probability for multicast and broadcast transmissions is reduced and transmissions are protected.

Described herein are message formats and apparatus that serve to reserve access to a communication medium in a multicast system. A first message, a multicast request-to-send message, includes a frame control field having identification of a frame type, a duration field having information representing the reserved time for a communication medium, a multicast receiver address field, a multicast transmitter address field, a field that identifies the number of slots for a clear-to-send response, and a field that identifies the number slots for a not-clear-to-send response. A second message includes a frame control field, a duration field, and a multicast receive address field. The second message has a format that can be used as one of a clear-to-send message in response to a multicast request-to-send message, a cancel-clear-to-send message that cancels a data transmission after the clear-to-send message is sent, and a not-clear-to-send message in response to the multicast request-to-send message.

BRIEF DESCRIPTION OF THE DRAWINGS

The present invention is best understood from the following detailed description when read in conjunction with the accompanying drawings. The drawings include the following figures briefly described below:

FIG. 3 depicts an exemplary format of a MB-RTS frame/message/signal.

FIG. 4 shows an exemplary format of a MB-CTS frame.

FIG. 5A shows an exemplary format of a MB-NCTS frame.

FIG. 5B shows an exemplary format of a CEL-MB-RTS frame.

FIG. 9 shows an exemplary format of a CEL-MB-CTS frame.

DETAILED DESCRIPTION OF THE PREFERRED EMBODIMENTS

In IEEE 802.11-based wireless local area networks, Carrier Sense Multiple Access with Collision Avoidance (CSMA/CA) is used for an access point (AP)/station (STA)/device/receiver/mobile device/mobile station/mobile terminal to access medium to transmit. In the following, unless otherwise specified, STAs include APs. In CSMA, an STA wishing to transmit first listens to the wireless medium/channel for a certain amount of time (an inter-frame interval/space plus a random backoff time following a busy medium condition), in order to check for any activity on the medium. If the medium is sensed "idle/clear" then the STA is permitted to transmit. If the medium is sensed as "busy" the STA has to defer its transmission. In CSMA, multiple STAs may transmit simultaneously, resulting in collisions. It should be noted that as used herein a mobile device includes but is not limited to a dual mode smart phone, a computer, a laptop computer, a notebook computer, a personal digital assistant (PDA) or any other device that can communicate using any part or portion of the wireless spectrum (airwaves).

Figure 1:
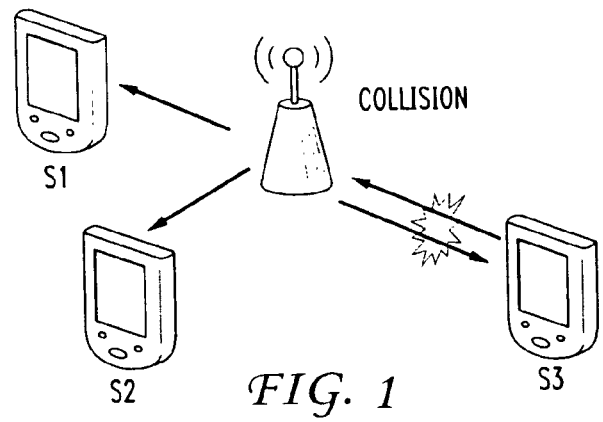
FIG. 1 is a schematic diagram of stations associated with an access point and showing collisions within a basic service set.
Figure 2:
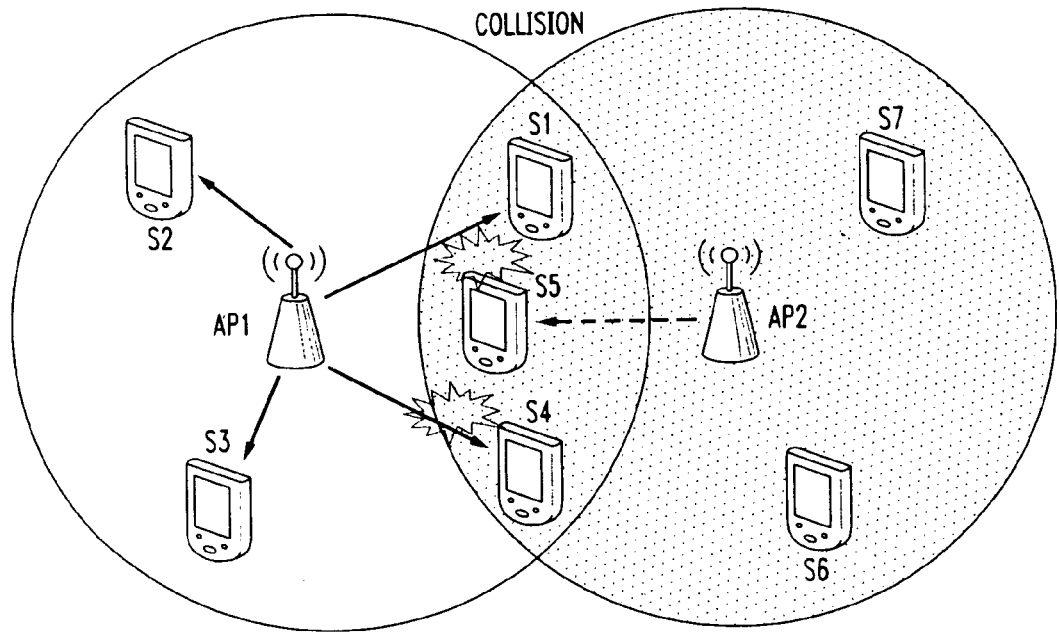
FIG. 2 is a schematic diagram showing collisions involving multiple basic service sets.

As shown in FIG. 1, stations associate with an AP. The AP with its associated stations forms a basic service set (BSS). As an example, if the AP and one or more of its associated STAs transmit simultaneously after sensing the medium idle/clear, the frames/packets transmitted by the AP and STAs collide and are lost. This type of collision occurs within the BSS and is called an intra-BSS collision. Another type of collision is shown in FIGS. 2. AP1 and AP2 operate on the same channel/frequency and overlap. The intersection of the circles represents the interference range of AP1 and AP2.

AP1 transmits data frames to its associated STAs, e.g. to STA S4 or STA S1. AP2 cannot hear AP1's transmission and thinks that the medium is idle. AP1 is a "hidden node" to AP2. AP2 may transmit frames to its associated STA S5 while AP1 is transmitting. Therefore, a collision occurs at STAs S1, S4 and S5, and STAs S1, S4 and S5 cannot receive the frames/data correctly. This type of collision is between BSSs and is called an inter-BSS collision.

In order to reduce collision probability between and among multiple STAs, a collision avoidance mechanism is used for unicast in IEEE 802.11 WLANs by reserving the medium for a period of time before transmitting actual data frames. It is also called virtual carrier-sense mechanism. When one STA wants to transmit to another STA, it senses the carrier. Carrier sensing includes both physical carrier sensing and virtual carrier sensing. Virtual carrier sensing indicates whether other STAs have reserved the medium. In carrier sensing (both physical carrier sensing and virtual carrier sensing), once the channel is idle/clear and the STA is permitted to transmit, an originating STA may send a request-to-send (RTS) frame to the receiving/destination STA. The receiving STA will reply with a clear-to-send (CTS) frame if the medium is also idle at the receiver. Only after receiving the CTS, does the originating STA start actual data frame transmission. If the originating STA does not receive the CTS reply, the originating STA may repeat the carrier sense and medium access process with a backoff time. The exchange of RTS and CTS occurs before actual data frame transmission. It reserves the medium for the following data transmission by telling all other STAs not to transmit over the wireless medium during the reserved duration that is specified in the duration field of the RTS and CTS frames. All STAs within the receiving range of either the originating STA or the destination STA learn of the medium reservation through the RTS or the CTS frames. Thus, even if a hidden STA cannot receive the RTS from the originating STA, it may still learn from the CTS about the impending use of the medium to transmit frames. For the above example in FIG. 2, AP2 will learn of the AP1's medium reservation from the CTS transmitted by STA S1 and will not transmit during the time period reserved by AP1.

However, in IEEE 802.11 WLANs, the collision avoidance mechanism cannot be used for broadcast and multicast. The reason is that there are multiple destinations for the RTS, and then potentially multiple concurrent senders of the CTS in response. Therefore, these CTS signals collide at the originating STA and the originating STA cannot receive the CTS successfully and initiate the following data frame transmission or frame exchange. The multicast and broadcast frames are sent immediately after carrier sense process without medium reservation in IEEE 802.11 WLANs. In the present invention, a multicast and broadcast collision avoidance mechanism is described. The mechanism reserves the medium and distributes the medium reservation information for the broadcast and multicast transmission. Broadcast is a special multicast that addresses all stations.

The present invention can be illustrated by the following examples. When a STA, e.g. an AP, wants to transmit multicast or broadcast frames to multiple receivers/destinations/devices, it performs carrier sense using CSMA. Unless otherwise specified, the carrier sense includes the physical and virtual carrier sense to make sure that the medium is physically idle with a certain time and the medium is not reserved by other STAs. Once the transmitting/originating STA successfully performs carrier sense and is ready to transmit, it transmits a signal such as a control/management frame to reserve the medium prior to the transmission of actual multicast and broadcast frames. This signal is called a multicast/broadcast request-to-send (MB-RTS) herein.

The MB-RTS frame/message/signal contains a frame control field, a duration/ID field, a receiver address (RA) field, a transmitter address (TA) field, the number of MB-CTS slots, the number of MB-NCTS slots, a frame check sequence (FCS) field, etc. As used herein slots are time slots or time periods. FIG. 3 depicts an exemplary format of a MB-RTS frame/message/signal. The frame control field identifies the frame type, frame subtype and flags. The duration/ID field gives the time period for which the originating STA desires to reserve the medium. The RA field indicates the medium access control (MAC) address of the intended receivers/destinations. It is a multicast or broadcast address. The TA field indicates the MAC address of the transmitter/originating STA. The FCS field is used by the receiver to determine if there is error in the received frame.

The difference between the MB-RTS field of the present invention and the IEEE 802.11 RTS is that the MB-RTS field contains the number of MB-CTS slots and the number of MB-NCTS slots. The number of MB-CTS field specifies a MB-CTS contention period (CCP), i.e. the number of time intervals/slots to be used by the MB-RTS receivers to send a positive reply signal. The CCP is divided into an integral number of transmission slots as specified in the number of MB-CTS slots field of the MB-RTS. Each MB-CTS slot represents the duration required to transmit one positive reply signal. The number of MB-NCTS field specifies a MB-NCTS negative contention period (NCCP), that is, the number of time intervals/slots to be used by the MB-RTS receivers to send the negative reply signal. The NCCP is divided into an integral number of transmission slots as specified in the number of MB-NCTS slots field of the MB-RTS. Each MB-NCTS slot represents the duration to transmit one negative reply signal.

After a multicast/broadcast receiver/device receives a MB-RTS, it determines whether to send a positive or negative reply using one of MB-CTS slots or one of MB-NCTS slots, respectively. If a multicast/broadcast receiver finds that the medium is idle through physical carrier sensing and virtual carrier sensing, it may send a positive reply signal, i.e. a control/management frame to positively respond to the MB-RTS, using one of the MB-CTS slots. Herein this positive reply is called a multicast/broadcast—clear-to-send (MB-CTS) frame. Virtual carrier sensing determines whether medium has been reserved by another STA for pending transmissions. The channel clear or idle means that the physical medium is idle without any ongoing transmission and no other STA has reserved the channel, i.e. both physical carrier sensing and virtual carrier sensing indicate that the channel/medium are idle. A MB-CTS frame/message/signal contains a frame control field, a duration/ID field, a receiver address (RA) and a frame check sequence (FCS), etc. The frame control field identifies the frame type, frame subtype and flags. The duration/ID field gives the remaining time that the medium is reserved. The RA field indicates the MAC address of the intended receiver/destination, which is the MAC address of the MB-RTS originator. FIG. 4 shows an exemplary format of a MB-CTS frame.

If a multicast/broadcast receiver finds that the medium is busy through physical carrier sensing and virtual carrier sensing, it may send a negative reply signal/message, i.e. a control/management frame to negatively respond to the MB-RTS, using one of the MB-NCTS slots. When either physical carrier sensing or virtual carrier sensing indicates a busy medium, the medium is considered busy. Herein, this negative reply signal is called a multicast/broadcast not-clear-to-send (MB-NCTS) frame. A MB-NCTS frame contains a frame control field, a duration/ID field, a receiver address (RA), a frame check sequence (FCS). The frame control field identifies the frame type, frame subtype and flags. The duration/ID field gives the remaining time that the medium is reserved or zero. The RA field indicates the MAC address of the intended receiver/destination, which is the MAC address of the MB-RTS originator. FIG. 5A shows an exemplary format of a MB-NCTS frame. Even if a multicast/broadcast receiver finds that the medium is busy through the physical carrier sensing and virtual carrier sensing, it may not send a MB-NCTS. The policy whether to send a MB-NCTS can be configured on a per-STA basis.

The multicast/broadcast receiver that intends to send a MB-CTS selects a MB-CTS slot to transmit. In one embodiment, the multicast/broadcast receiver can randomly select a MB-CTS slot out of k MB-CTS slots, where k is the value of the number of MB-CTS slots field in the received MB-RTS. The multicast/broadcast receiver that intends to send an MB-NCTS will select a MB-NCTS slot to transmit. In one embodiment, the multicast/broadcast receiver can randomly select a MB-NCTS slot out of m MB-NCTS slots, where m is the value of the number of MB-NCTS slots field in the received MB-RTS. A special case is that the value of the number of MB-CTS slots k and/or the value of the number of MB-NCTS slots m is zero in the MB-RTS frame, which means that the multicast/broadcast receivers are not permitted to send a MB-CTS frame/message and/or a MB-NCTS frame/message. Another special case is that the value of the number of MB-CTS slots k and/or the value of the number of MB-NCTS slots m is one in the MB-RTS frame/message. This means that the multicast/broadcast receivers can only send MB-CTS messages/frames in one slot and/or MB-NCTS messages/frames in one slot.

Multiple multicast/broadcast receivers may each send a MB-CTS message/frame and/or a MB-NCTS message/frame in response to the MB-RTS message/frame from the originating STA. If the originating STA receives no signal (the physical medium is idle) during the NCCP period (i.e. the time for MB-NCTS slots), and at least one MB-CTS signal during the CCP period (i.e. the time for MB-CTS slots), the originating STA can use the remaining duration of time that it reserved for the medium access in its original MB-RTS to transmit pending multicast/broadcast data or management frames or initiate pending frame exchanges. The frame exchanges include the originating STA sending multicast/broadcast frames/messages/data and the multicast/broadcast receivers sending responses if there is any response, e.g. acknowledgements. Otherwise, the originating STA repeats the carrier sensing and medium reservation procedure after a backoff time. Note that the MB-RTS originating STA can determine that a MB-CTS signal/frame/message is received in a MB-CTS slot if (1) a MB-CTS frame/message/signal is correctly received in a MB-CTS slot or (2) the frame/message/signal was not received correctly but transmission is detected over the wireless medium during this MB-CTS slot. The latter case may occur when multiple STAs send the MB-CTS frame/message/signal using the same MB-CTS slot in response to the MB-RTS frame/message.

In an alternative embodiment, if the originating STA receives no signal during the CCP period (the time for MB-CTS slots), or receives at least one MB-NCTS signal during the NCCP period (the time for MB-NCTS slots), the originating STA may optionally send a signal/control frame/management frame to cancel the previously transmitted MB-RTS frame/message. Herein this signal is called a cancel multicast/broadcast-request-to-send (CEL-MB-RTS). A CEL-MB-RTS frame/message/signal contains a frame control field, a duration/ID field, a receiver address (RA) field, a transmitter address (TA) field, a frame check sequence (FCS) field, etc. FIG. 5B shows an exemplary format of a CEL-MB-RTS frame. The frame control field identifies the frame type, frame subtype and flags. The duration/ID field contains the remaining time that the medium is reserved. The RA field indicates the MAC address (multicast) of the intended receivers/destinations. The TA field indicates the MAC address of the transmitter. The FCS field is used by the receivers to check if there are errors in the received frame. Whether a STA uses this alternative embodiment can be configured. A STA receiving a CEL-MB-RTS resets its network allocation vector (NAV) if the STA used information from the previous MB-RTS frame/message as the most recent basis to update its NAV setting.

Figure 6:
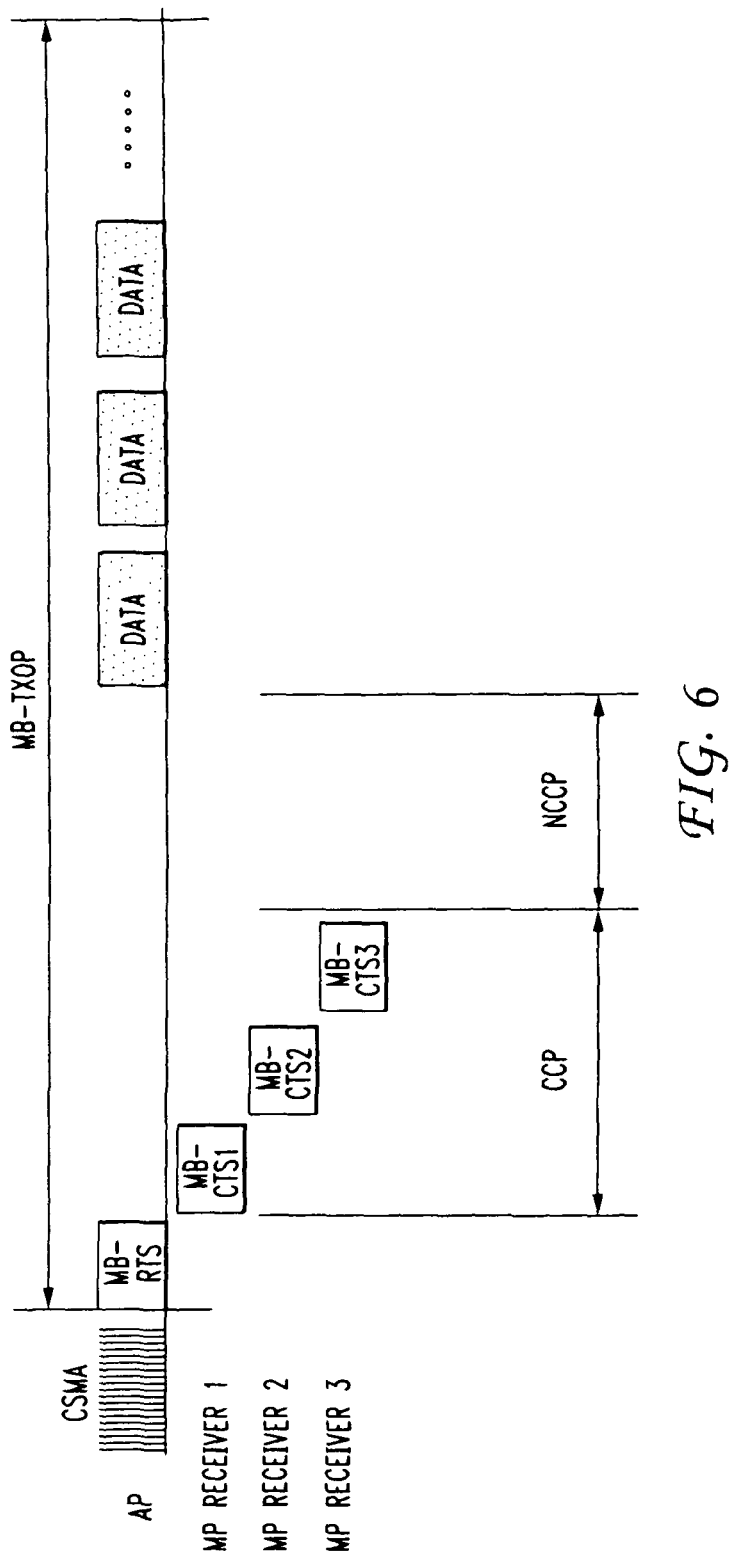
FIG. 6 shows the operation and frame exchange sequence between the originating multicast/broadcast STA and the recipient multicast/broadcast STAs in accordance to the present invention.

FIG. 6 shows the operation and frame exchange sequence between the originating multicast/broadcast STA and the recipient multicast/broadcast STAs in accordance to the present invention. For example, in a CSMA multicast/broadcast system to reserve a multicast/broadcast opportunity (MB-TXOP), an AP is associated with three multicast/broadcast receivers. The AP sends a MB-RTS frame/message/signal to reserve the medium after the AP successfully performs carrier sensing. The multicast/broadcast receivers then respond in the time slots allocated for their responses in the MB-RTS message/frame. Multicast/broadcast receivers 1, 2 and 3 each respond positively by transmitting a MB-CTS frame/message/signal. No multicast/broadcast receiver responds negatively by transmitting a MB-NCTS frame/message/signal. Since the AP receives at least one MB-CTS and does not receive MB-NCTS, the MB-TXOP is obtained. The AP transmits the pending data frames in the reserved MB-TXOP.

Figure 7:
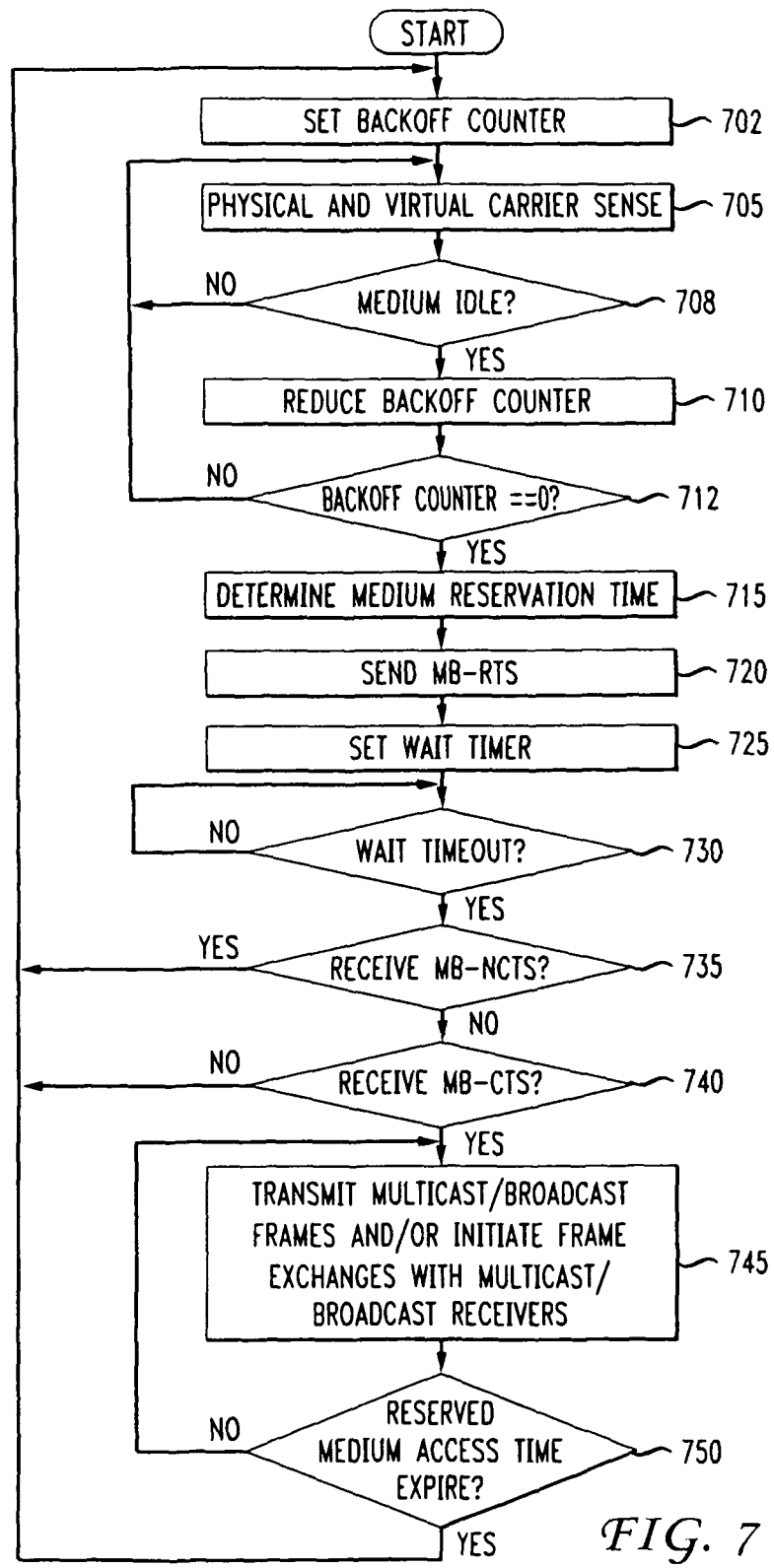
FIG. 7 is a flowchart of the operation of the originating STA to reserve the medium for multicast/broadcast transmission in accordance with the principles of the present invention.

FIG. 7 is a flowchart of the operation of the originating STA to reserve the medium for multicast/broadcast transmission in accordance with the principles of the present invention. At 702 the AP initializes the backoff counter. It performs physical and virtual carrier sensing in order to determine if the medium is idle at 705. A test is performed at 708 on the results of the carrier sensing. If the medium is not idle (the medium is busy) then the AP performs carrier sensing again. If the medium is idle, then at 710 the AP decrements/decreases/reduces its backoff counter. A test is performed at 712. If the backoff counter is not zero, the AP performs carrier sensing again. If the backoff counter is zero, at 715 the AP determines the medium reservation time and constructs/builds the MB-RTS frame/message/signal. The medium reservation time is the sum of the time required to transmit a MB-RTS frame/message/signal, the sum of the transmission times for the number of MB-CTS and MB-NCTS time slots and the amount of time needed to transmit the data that the AP needs to send (plus any inter-frame guard times). At 720, the AP transmits the MB-RTS frame/message/signal to its associated receivers. The AP sets a wait timer at 725 to wait for its associated receivers to respond with MB-CTS and/or MB-NCTS frames. The AP continues to check the wait timer at 730 for the wait timer to expire. Once the wait timer has expired, the AP determines if it has received any MB-NCTS frames at 735. If the AP has received any MB-NCTS frames then it proceeds to 702 to wait a backoff time and perform carrier sensing again. If the AP has not received any MB-NCTS frames then the AP determines if it has received any MB-CTS frames at 740. If the AP has not received any MB-CTS frames then it proceeds to 702 to wait a backoff time and perform carrier sensing again. If the AP has received MB-CTS frames from its associated receivers then at 745, the AP transmits multicast/broadcast frames and/or initiates frame exchanges with its associated multicast/broadcast receivers. At 750 the AP determines if the medium reservation access time has expired. If the medium access reservation time has expired then the AP proceeds to 702 to wait a backoff time and perform carrier sensing again. If the medium access reservation time has not expired the AP continues to transmit multicast/broadcast frames and/or initiate frame exchanges with its associated receivers.

In an alternative embodiment, the originating STA receives N signals during the NCCP period and C MB-CTS signals during the CCP period. If $N<Nt$ and $C>=Ct$, the originating STA can use the remaining duration of time that it reserved for the medium access in its original MB-RTS to transmit pending multicast/broadcast data or management frames or initiate pending frame exchanges. Nt and Ct are the parameters that can be configured.

In another embodiment, the originating STA receives N signals during the NCCP period and C MB-CTS signals during the CCP period. If $N>=Nt$ or $C<Ct$, the originating STA may optionally send a signal/control/management frame (CEL-MB-RTS) to cancel the previously transmitted MB-RTS frame/message/signal.

Figure 8A:
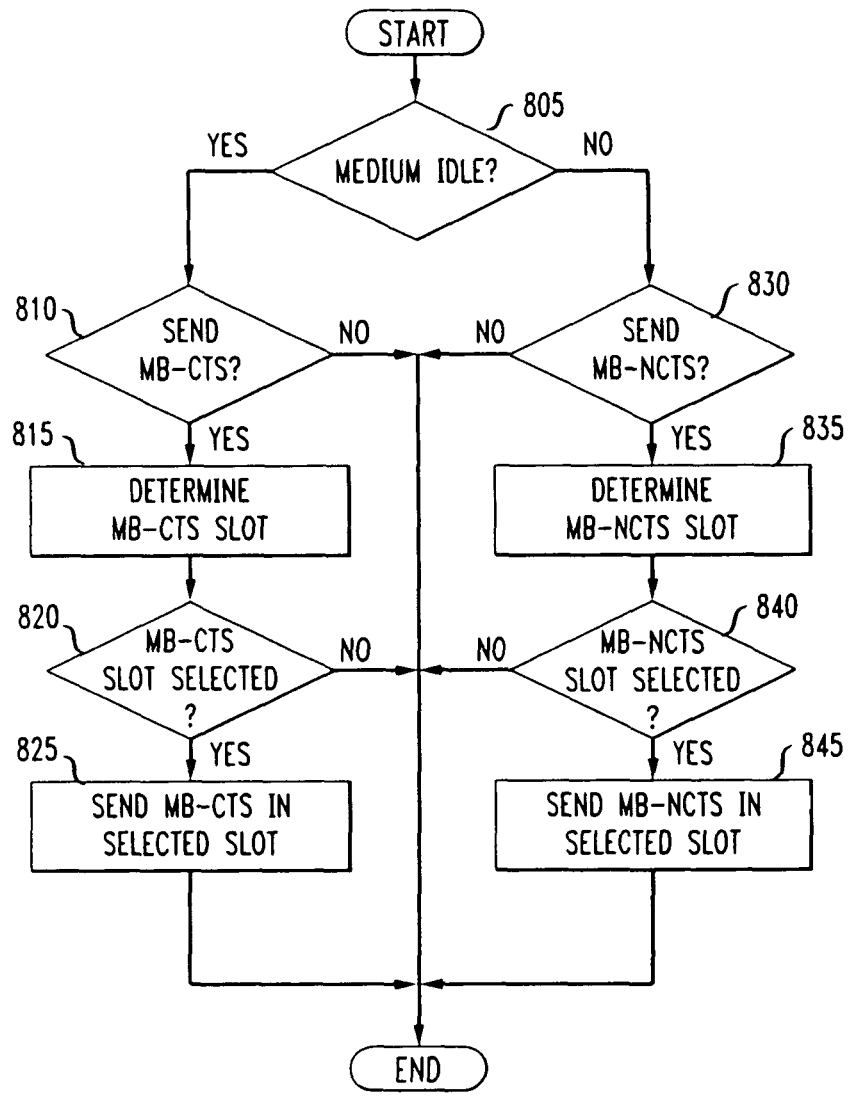
FIGS. 8A and 8B together are a flowchart of the operation of the multicast/broadcast recipient STAs in response to a MB-RTS from the originating STA in accordance with the principles of the present invention. The processing of FIG. 8B is optional.
Figure 8B:
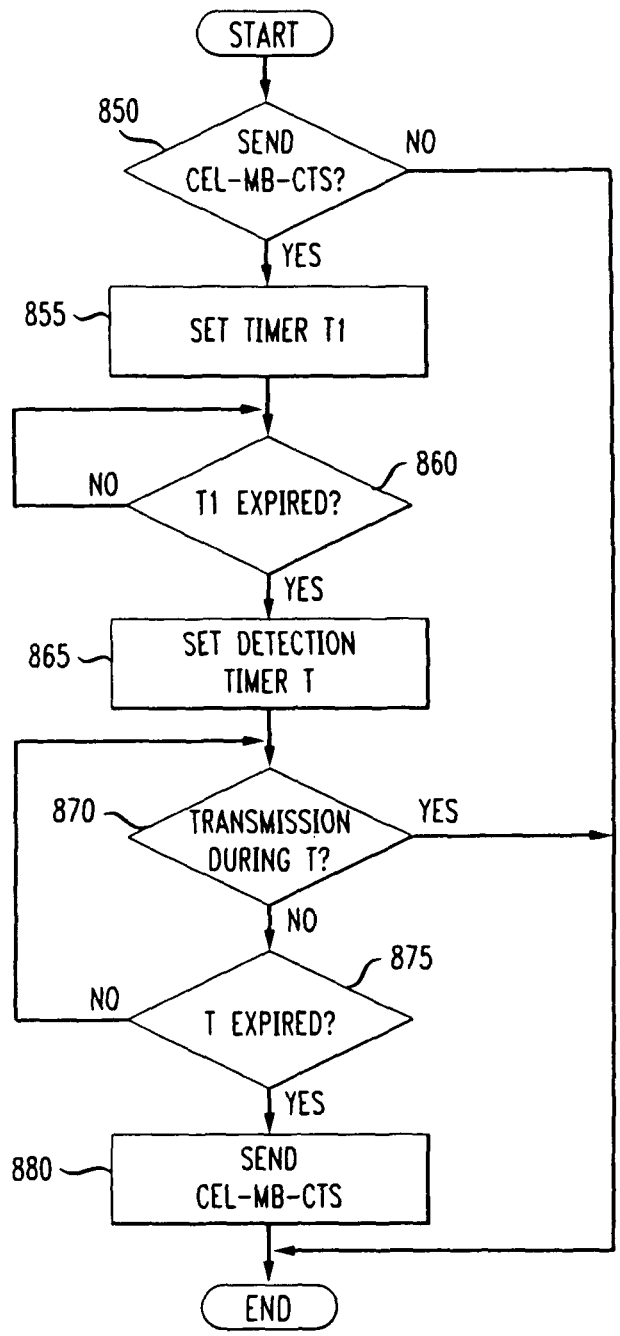

FIGS. 8A and 8B together are a flowchart of the operation of the multicast/broadcast recipient STAs in response to a MB-RTS from the originating STA in accordance with the principles of the present invention. The processing of FIG. 8B is optional. At 805 the medium is tested to determine if it is idle. If the medium is idle then a determination is made at 810 whether to send a MB-CTS message/signal/frame based on the policy and the number of MB-CTS slots allocated/specified in the received MB-RTS signal/frame/message. If it is determined that a MB-CTS message/frame/signal is to be sent then at 815 a MB-CTS slot is selected from among the MB-CTS slots allocated/specified in the MB-RTS signal/frame/message. A test is performed at 820 to determine if a slot has been selected. If no slot has been selected, then the processing ends. If a MB-CTS slot has been selected then a MB-CTS message/frame/signal is sent/transmitted to the originating STA of the MB-RTS at 825. If the medium is not idle/busy then a determination is made at 830 whether to send a MB-NCTS message/signal/frame based on the policy and the number of MB-NCTS slots allocated/specified in the received MB-RTS signal/frame/message. If it is determined that a MB-NCTS message/frame/signal is to be sent then at 835 a MB-NCTS slot is selected from among the MB-NCTS slots allocated/specified in the MB-RTS signal/frame/message. A test is performed at 840 to determine if a slot has been selected. If no slot has been selected, then the processing ends. If a MB-CTS slot has been selected then a MB-CTS message/frame/signal is sent/transmitted to the originating STA of the MB-RTS at 845.

FIG. 8B as indicated above is optional. That is, based on policy or configuration it is optional whether a cancellation message/frame/signal (CEL-MB-CTS) is sent if after sending a MB-CTS message/frame/signal the STA determines that the medium is not used by the originating STA of the MB-RTS (e.g. if no frame is transmitted over medium during detection period). At 850 a determination is made whether to send a CEL-MB-CTS message/frame/signal. If a determination is made to send a CEL-MB-CTS message/frame/signal then at 855 timer T1 is set/initialized. At 860 timer T1 is tested and a tight loop is executed until timer T1 expires. Once timer T1 expires then at 865 detection timer T is set. A test is performed at 870 to determine if there are/have been any transmissions during interval T. If there have not been any transmissions during interval T, then a test is performed at 875 to determine if interval T has expired. If interval T has expired then a CEL-MB-CTS message/frame/signal is sent/transmitted. If a determination is made not to send a CEL-MB-CTS message/frame/signal then processing ends. If there was a transmission during interval T then processing ends. If timer T has not expired then processing continues at 870.

The exchange of MB-RTS and MB-CTS frames reserves the medium for a period of time to transmit data and management frames/signals/messages. The MB-RTS, MB-CTS and MB-NCTS frames contain a duration/ID field that specifies a period of time that the medium is to be reserved for a multicast/broadcast transmission opportunity (MB-TXOP). The MB-TXOP is an interval of time when a particular STA has the right to initiate one or more frame transmission or frame exchange sequences over/using the wireless medium. A MB-TXOP is defined by a starting time and a maximum duration. The value of the duration/ID field in a MB-RTS frame is set to be the remaining duration of the MB-TXOP that the originating STA desires to reserve the medium. It includes the time required to transmit the k MB-CTS frames, m MB-NCTS frames, and inter-frame guard time intervals, plus the time reserved for transmitting the pending data, management frames and the response frames (if there are response frames such as acknowledgement frames). The duration value in the MB-CTS and MB-NCTS is the value obtained from the duration field of the immediately previous MB-RTS frame, minus the time that has passed and the time required to transmit this MB-CTS or MB-NCTS frames/messages and the inter-frame guard time intervals. That is, the duration value in the MB-CTS and MB-NCTS is set to be the remaining duration of the MB-TXOP. In an alternative embodiment, the duration value in the MB-NCTS is set to zero.

All STAs within the reception range of the originating STA learn of the requested medium reservation through the MB-RTS message/frame/signal. When a non-multicast/broadcast recipient STA (i.e. the STA that is not addressed by the MB-RTS fame/signal/message) receives a MB-RTS frame/signal/message, it updates its NAV to indicate the medium occupation/reservation time based on the information in the duration/ID field of the received MB-RTS frame if the new NAV value is greater than the current NAV value. The NAV maintains a prediction of future traffic on the medium, i.e. the virtual-carrier sense status. While the NAV is set (non-zero), the virtual carrier-sense indication is that the medium is busy during the period while the NAV is set; when the NAV is not set (zero), the indication is that the medium is idle. The STAs that are not part of the originating STA's BSS and do not receive the MB-RTS learn of the medium reservation through one or more MB-CTS frames/messages/signals sent by receiving STAs associated with the access point (STA). A STA receiving/overhearing a valid MB-CTS updates their NAV based on the information received in the duration/ID field of the MB-CTS frame, but only if the new NAV value is greater than the current NAV value and only if the MB-CTS frame/signal/message is not addressed to the receiving STA (the STA that is not the originating STA of the MB-RTS) and only if the STA did not receive the previous MB-RTS. It is possible that a receiving STA did not receive the MB-RTS frame/signal/message (e.g. if it was out of the reception range of the originating STA), but does receive the MB-CTS frame/signal/message sent from one of the multicast/broadcast recipient STAs. The MB-RTS/MB-CTS mechanism may improve operation in situations where multiple BSSs utilizing the same channel/medium overlap. It may also reduce collisions as STAs that did not receive a MB-RTS frame/message/signal from the originating STA (i.e they are hidden nodes to the MB-RTS originator), but still know from the MB-CTS frames/messages/signals about the medium's impending reservation (within the reception range of the MB-CTS senders). A STA receiving a MB-NCTS frame/signal/message that is not addressed to it shall ignore the MB-NCTS frame/signal/message.

In an alternative embodiment, a STA receiving a MB-NCTS frame/signal/message that is not addressed to it may reset its NAV if the STA used information from a previous MB-CTS frame/signal/message or a previous MB-RTS frame/signal/message as the most recent basis to update its NAV setting. The STA shall ignore the MB-NCTS that is not addressed to it if it did not use information from the previous MB-CTS frame/signal/message or a previous MB-RTS frame/signal/message as the most recent basis to update its NAV setting. Whether a STA uses this alternative embodiment can be configured.

A STA that used information from the MB-RTS frame/message/signal as the most recent basis to update its NAV setting is permitted to reset its NAV if no physical layer transmission is detected during a time period T starting at the time T1 and ending at the time T2 (T=T2−T1). T1 can be calculated as the time that the MB-RTS frame was received+(# of MB-CTS slots)*(MB-CTS_Time)+(# of MB-NCTS slots)*(MB-NCTS Time)+the time for all inter-frame guard intervals. T2 is equal to T1+wait_time. MB-CTS_Time is the time to transmit a MB-CTS frame/message/signal. MB-NCTS_Time is the time to transmit a MB-NCTS frame/signal/message. Wait_time is a parameter to wait to make sure that there is no transmission over the wireless medium. The MB-CTS_Time and MB-NCTS_Time are calculated using the size of the MB-CTS/MB-NCTS frames/signals/messages and the data rate at which the MB-RTS frame/message/signal used for the most recent NAV update was received.

Figure 9:
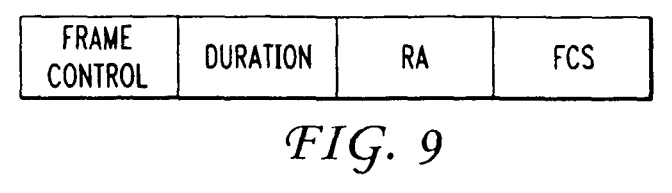

A STA that has sent a MB-CTS in response to the MB-RTS may optionally send a signal/control frame/management frame to cancel the previously transmitted MB-CTS if no physical layer transmission is detected during the above time period T starting at the time T1 and ending at the time T2 (T=T2−T1). Herein this signal/message/frame is called a cancel-multicast/broadcast-clear-to-send (CEL-MB-CTS). A CEL-MB-CTS frame contains a frame control field, a duration/ID field, a receiver address (RA), a frame check sequence (FCS). The frame control field identifies the frame type, frame subtype and flags. The duration/ID field gives the remaining time that the medium is reserved or zero. The RA field indicates the MAC address of the intended receivers/destinations, which is the MAC address of the MB-RTS originator. FIG. 9 shows an exemplary format of a CEL-MB-CTS frame. Whether to send the optional CEL-MB-CTS frame can be configured on a per-STA basis. A STA receiving a CEL-MB-CTS resets its NAV if the STA used information from the previous MB-CTS frame as the most recent basis to update its NAV setting.

In an alternative embodiment, A STA that has sent a MB-CTS in response to the MB-RTS may optionally send a signal/control frame/management frame to cancel the previously transmitted MB-CTS if this STA reset its NAV after receiving a MB-NCTS that is not addressed to it.

Figure 10:
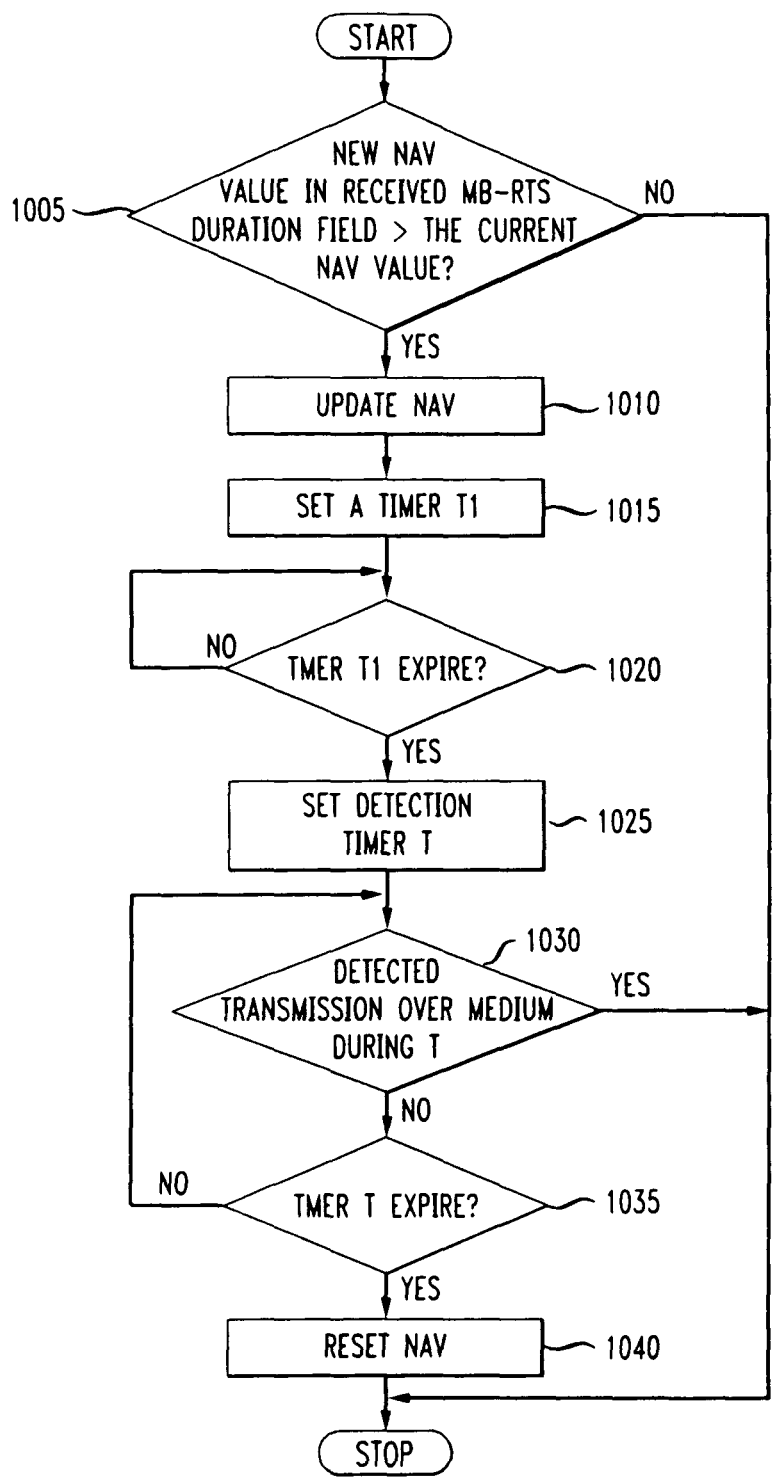
FIG. 10 is a flowchart of the operation of a STA receiving a MB-RTS frame/message/signal when the STA is neither the originator nor the receiver/destination of the MB-RTS message/signal/frame.

FIG. 10 is a flowchart of the operation of a STA receiving a MB-RTS frame/message/signal when the STA is neither the originator nor the receiver/destination of the MB-RTS message/signal/frame. At 1005 a test is performed to determine if the NAV value in the MB-RTS message/signal/frame duration field is greater than the NAV value that the STA currently has stored. If the new NAV value in the MB-RTS message/signal/frame duration field is greater than the NAV value that the STA currently has stored then the current NAV value that the STA has is updated to the NAV value in the received MB-RTS frame/signal/message at 1010. If the new NAV value in the MB-RTS message/signal/frame duration field is less than or equal to the NAV value that the STA currently has stored, then processing stops. At 1015 a timer T1 is set. At 1020 a test is performed to determine if timer T1 has expired. If timer T1 has not expired then processing continues in a tight loop on itself until timer T1 expires. At 1025 detection timer T is set. A test is performed at 1030 to determine if transmission has been detected over the medium/channel during time interval T. If transmission has been detected over the medium/channel during time interval T, then processing stops. If no transmission has been detected over the medium/channel during time interval T, then a test is performed at 1035 to determine if timer T has expired. If timer T has not expired, then processing continues at 1030. If timer T has expired, then the NAV value is reset to the previous value before updating with the received MB-RTS minus/less the time that has passed.

Figure 11:
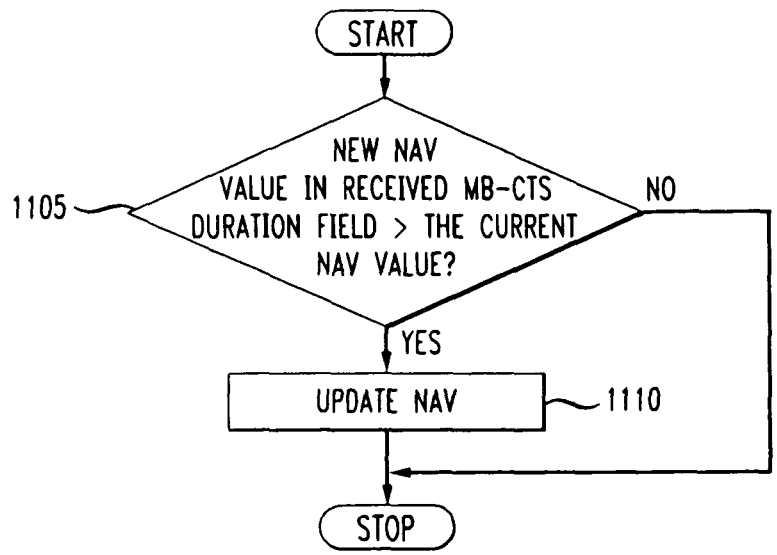
FIG. 11 is a flowchart of the operation of a STA receiving a MB-CTS signal/message/frame when the MB-CTS frame/message/signal is not addressed to the receiving STA and the STA did not receive the previous MB-RTS message/frame/signal.

FIG. 11 is a flowchart of the operation of a STA receiving a MB-CTS signal/message/frame when the MB-CTS frame/message/signal is not addressed to the receiving STA and the STA did not receive the previous MB-RTS message/frame/signal. At 1105 a test is performed to determine if the new NAV value in the received MB-CTS duration field is greater than the NAV value that the STA currently has stored. If the new NAV value in the received MB-CTS message/frame/signal duration field is greater than the NAV value that the STA currently has stored, then the current NAV value that the STA has is updated to the NAV value in the received MB-CTS frame/signal/message at 1110. If the new NAV value in the received MB-CTS message/frame/signal duration field is less than or equal to the NAV value that the STA currently has stored, then processing stops.

Figure 12:
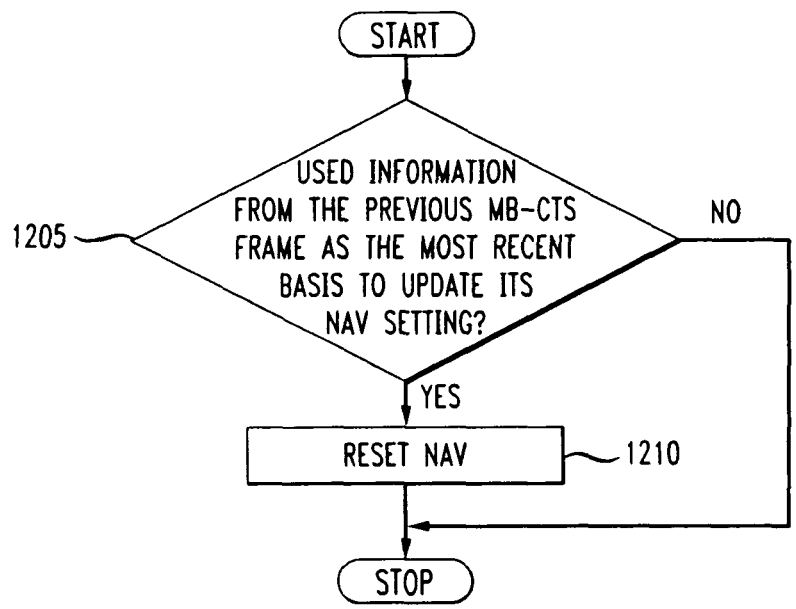
FIG. 12 is a flowchart of the operation of a STA receiving a CEL-MB-CTS frame/message/signal when the STA is not the STA addressed by this CEL-MB-CTS message/signal/frame.

FIG. 12 is a flowchart of the operation of a STA receiving a CEL-MB-CTS frame/message/signal when the STA is not the STA addressed by this CEL-MB-CTS message/signal/frame. At 1205 a test is performed to determine if the STA used information from the previous MB-CTS frame/message/signal as the most recent basis to update its NAV value. If the STA used information from the previous MB-CTS frame/message/signal as the most recent basis to update its NAV value, then the STA resets its NAV value to the previous value before updating with the MB-CTS minus/less the time that has passed. If the STA did not use information from the previous MB-CTS frame/message/signal as the most recent basis to update its NAV value, then processing stops An alternative embodiment is described below, in which a multicast/broadcast receiver selects one of the MB-CTS slots to send the MB-CTS frame/signal/message if the multicast/broadcast receiver receives a MB-RTS and determines that the medium is idle through the physical carrier sense and virtual carrier sense.

The MB-CTS contention period (CCP) is divided into an integral number of transmission slots as specified in the # of MB-CTS slots field of the MB-RTS frame/message/signal. Arbitration of access to the medium during CCP is achieved by running a probabilistic contention resolution algorithm at each of the STAs that wish to transmit a MB-CTS signal/frame/message in any one of the MB-CTS transmission slots.

Each STA maintains an Overlap Degree (OD) which is the number of unique beacons it receives from different APs. Associated with each OD is a MB-CTS transmission probability $N_oD$). Each STA that successfully receives a MB-RTS message/frame/signal and determines that the medium is idle through physical and virtual carrier sensing, contends for a transmission slot in the CCP.

Figure 13:
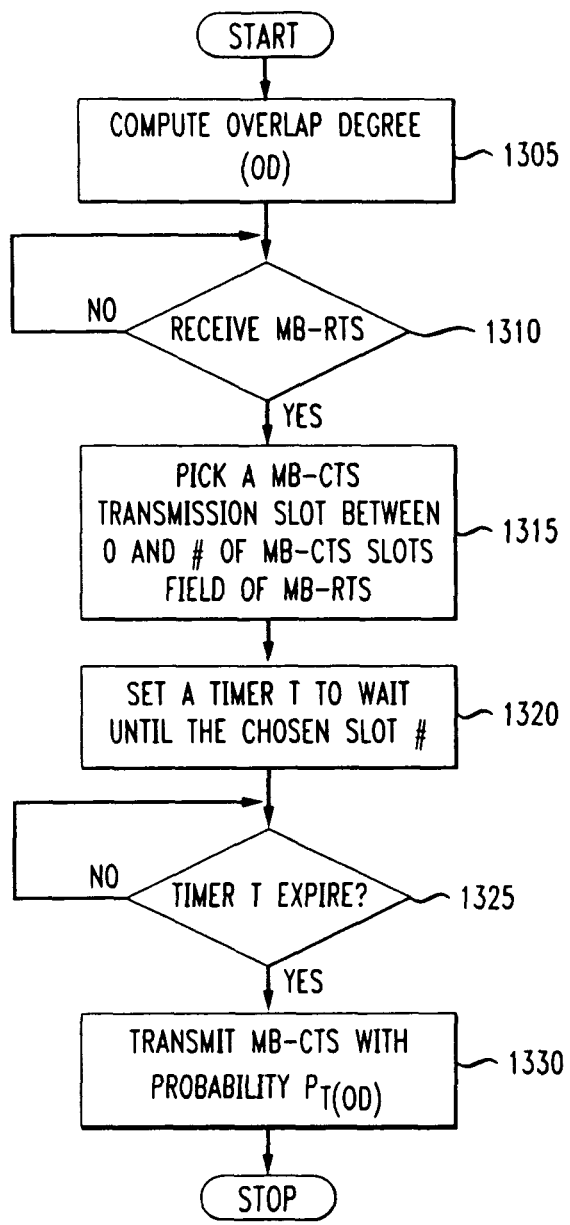
FIG. 13 is a flowchart of the STA operation using the distributed probabilistic contention resolution scheme.

In one case the scheme runs once (in a single round). All STAs pick one transmission slot in the CCP and transmit a MB-CTS frame/message/signal in that slot with probability $P_{T(OD)}$. FIG. 13 is a flowchart of the STA operation using the distributed probabilistic contention resolution scheme. At 1305 the OD is calculated/computed/determined. A test is performed at 1310 to determine if the STA received a MB-RTS message/frame/signal. If the STA did not receive a MB-RTS message/frame/signal, then processing continues in a tight loop until a MB-RTS frame/signal/message is received. If the STA received a MB-RTS frame/message/signal, then at 1315 the STA selects a MB-CTS transmission slot between 0 and the number of MB-CTS transmission slots specified in the MB-CTS transmission slot field of the MB-RTS signal/frame/message. A timer T is set at 1320. Timer T is used to wait for the chosen MB-CTS transmission slot. At 1325 a test is performed to determine if timer T has expired. If timer T has not expired then processing continues in a tight loop until timer T expires. If timer T has expired, then at 1330 the MB-CTS frame/message/signal is transmitted with probability $P_{T(OD)}$.

Figure 14:
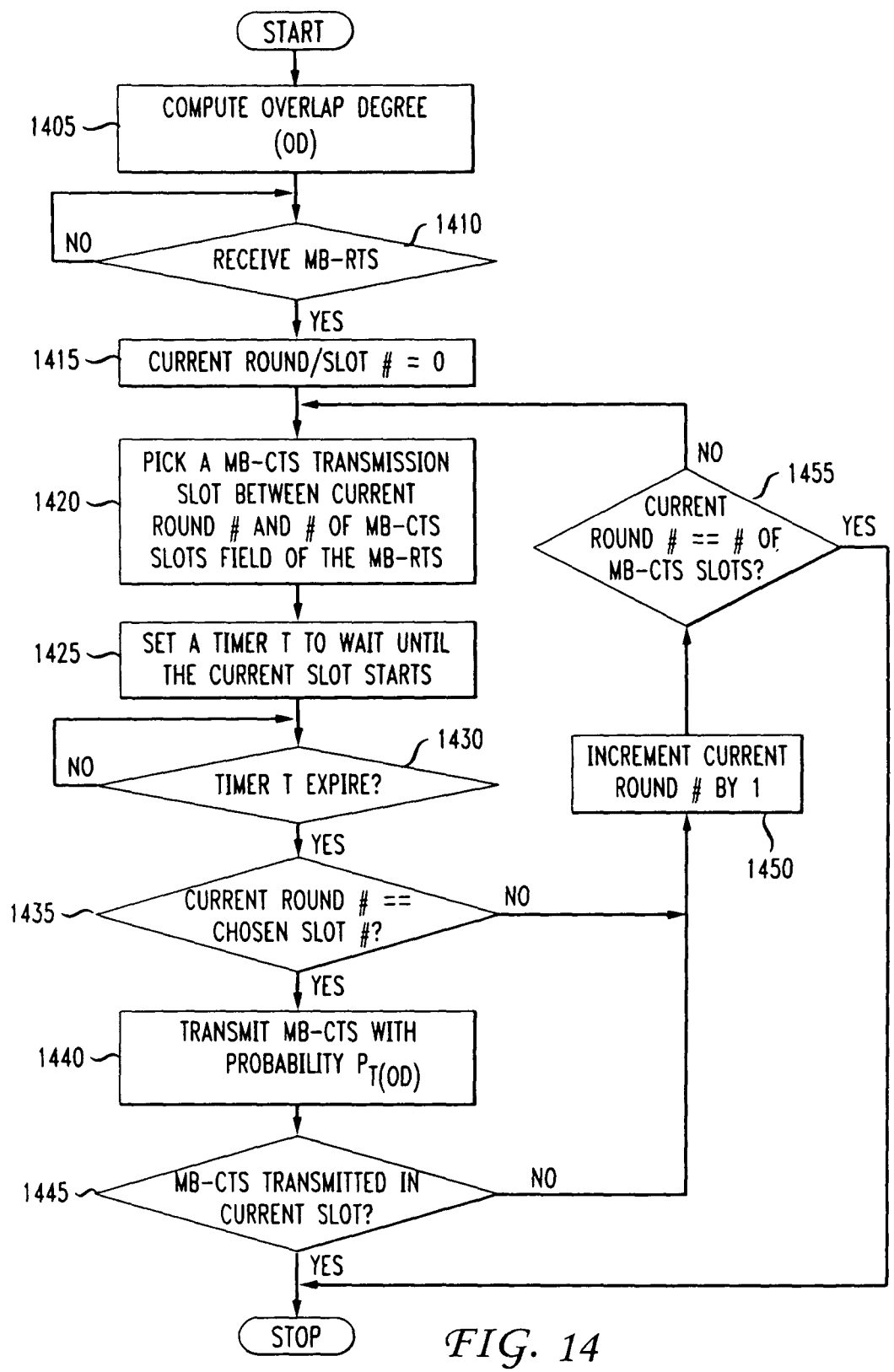
FIG. 14 is a flowchart of STA operation using the distributed multi-round probabilistic contention resolution scheme.

In another case, the scheme runs multiple times (in multiple, rounds), ranging from 0 to the number of MB-CTS transmission slots. In each round, STAs pick a number between the current round/slot # and the maximum round/slot #. All STAs that have not picked the current round/slot number, defer from transmitting a MB-CTS message/signal/frame. All STAs that have picked the current round/slot number defer from transmitting a MB-CTS in that slot with probability $(1-P_{T(OD)})$. All STAs that do not transmit during a particular round (either because they did not choose that round # or because their MB-CTS transmission probability caused them to defer transmission in that round) move on to compete in the next round. All STAs which did get a chance to transmit in a particular round, refrain from competing in any further/future rounds. FIG. 14 is a flowchart of STA operation using the distributed multi-round probabilistic contention resolution scheme. At 1405 the OD is calculated/computed/determine. A test is performed at 1410 to determine if a MB-RTS signal/message/frame has been received. If a MB-RTS signal/message/frame has not been received, then processing continues in a tight loop until a MB-RTS message/signal/frame is received. If a MB-RTS signal/message/frame has been received, then at 1415 the current/round/slot number is set to 0. At 1420 a MB-CTS transmission slot is selected. The MB-CTS transmission slot is between the current round/slot number and the number of MB-CTS transmission slots in the MB-CTS transmission slots field of the MB-RTS frame/signal/message. A timer T is set at 1425 to wait until the current slot commences/starts/begins. A test is performed at 1430 to determine if timer T has expired. If timer T has not expired then processing continues in a tight loop until timer T expires. If timer T has expired then at 1435 a test is performed to determine if the current round number is equal to the chosen slot number. If the current round number is equal to the chosen slot number, then at 1440 the MB-CTS frame/signal/message is transmitted with probability $P_{T(OD)}$. At 1445 a test is performed to determine if the MB-CTS frame/signal/message was transmitted in the current slot. If the MB-CTS frame/signal/message was transmitted in the current slot, then processing stops. If the MB-CTS frame/signal/message was not transmitted in the current slot, then at 1450 the current round number is incremented by 1. At 1455 a test is performed to determine if the current round number is equal to the number of MB-CTS transmission slots specified in the MB-CTS transmission slots filed of the MB-RTS frame/message/signal. Processing continues at 1420. If the current round number is not equal to the chosen slot number, then processing continues at 1450.

Figure 15:
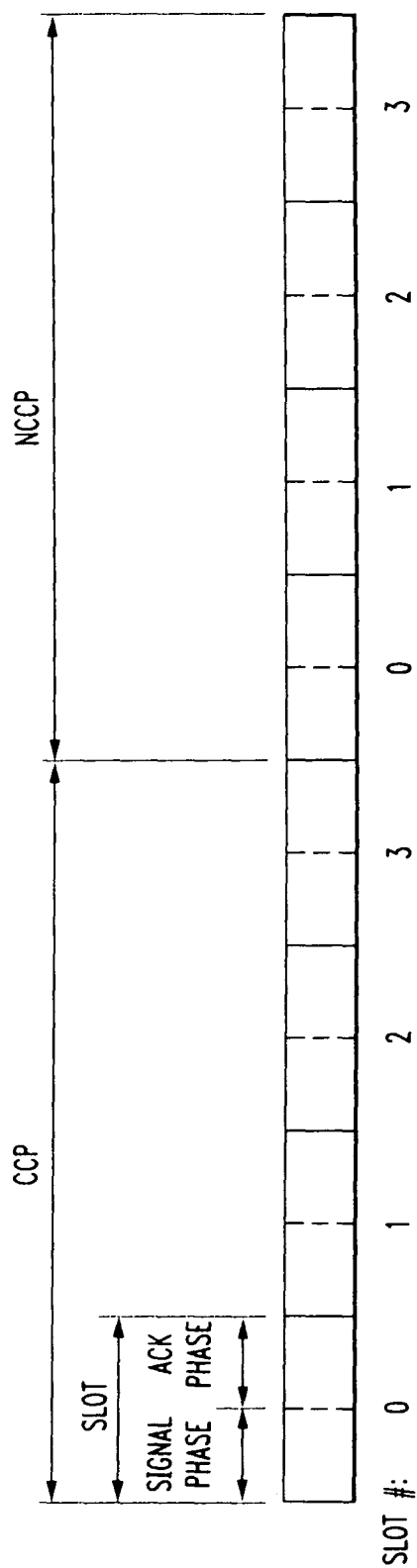
FIG. 15 shows the division of CCP into slots and phases.

To further optimize the single and multi-round probabilistic contention resolution schemes, each transmission slot in a CCP is split into two phases—a signaling phase and an acknowledgement (ACK) phase. The signaling phase is used by the STAs to transmit MB-CTS frame/signal/message, while the acknowledgement phase is used by the STA (which originally transmitted the MB-RTS message/signal/frame) to send MB-CTS ACK. FIG. 15 shows the division of CCP into slots and phases. All STAs with OD equal to one, which hear the MB-CTS ACK during the acknowledgement phase of a particular slot interval, refrain from transmitting in subsequent slot intervals.

When transmission probabilities are assigned in increasing order of ODs, STAs with higher ODs are given higher preference. This increases the range and potency of the MB-CTS frame/signal/message, as it is more likely to be heard by multiple overlapped APs. The same schemes can be used for resolving contention of the MB-NCTS slots among MB-NCTS transmitters.

The present invention can also be used for a station (STA includes stations and APs) to reserve the medium and distribute the medium reservation information for multicast and broadcast transmissions in a wireless mesh network, a wireless local area network (WLAN), an ad hoc network or an independent basic service set (IBSS). The present invention can be used for peer-to-peer multicast among the stations. The station can use the method of the present invention to access the channel for transmitting multicast data to other stations, for example in video conferencing or other peer-to-peer services.

In another embodiment, the method in the present invention can be used in IP layer. If the method in the present invention is used on the IP layer, the receiver/destination addresses and transmitter/originator/source addresses in the MB-RTS/MB-CTS/MB-NCTS/CEL-MB-RTS/CEL-MB-CTS messages are IP addresses.

Figure 16:
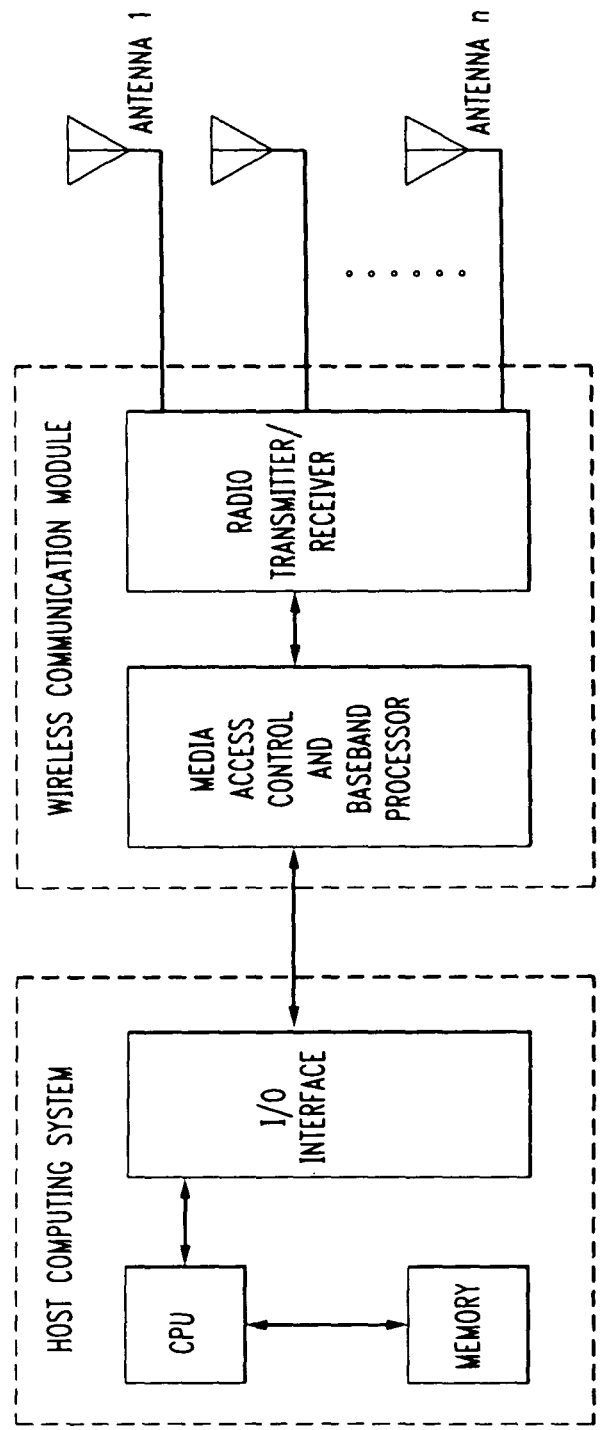
FIG. 16 is a block diagram of an exemplary implementation of the present invention.

Referring now to FIG. 16, which is a block diagram of an exemplary implementation of the present invention. Since a STA and/or AP (which is a special STA) can be a transmitter, a receiver or a transceiver, a single block diagram is used showing a wireless communication module having a radio transmitter/receiver. That is, the radio transmitter/receiver can be a transmitter, a receiver or a transceiver. The present invention includes a host computing system and a communication module (wireless). The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The MAC and baseband processor performs MAC control and data framing, modulation/demodulation, coding/decoding for the transmission/receiving. At least one embodiment of the present invention can be implemented as a routine in the host computing system or wireless communication module to process the transmission and receiving of data and control signal. That is, the block diagram of FIG. 16 may be implemented as hardware, software, firmware, a field programmable gate array (FPGA), an application specific integrated circuit (ASIC), a reduced instruction set computer (RISC) or any combination thereof. Further, the exemplary processes illustrated in the various flowcharts and text above are operationally implemented in either the host processing system or the wireless communication module or a combination of the host processing system and the communication module. The block diagram thus fully enables the various methods/processes to be practiced in hardware, software, firmware, a field programmable gate array (FPGA), an application specific integrated circuit (ASIC), a reduced instruction set computer (RISC) or any combination thereof.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. An apparatus that receives a multicast digital message while operating on a channel in a wireless communication medium, the apparatus comprising:
   a receiver receiving the multicast digital message from a transmitter on the channel in the medium, the multicast digital message having a format comprising:
      a duration field specifying a time period for which the transmitter desires to reserve the medium;
      a multicast receiver address field specifying a multicast medium access control ("MAC") address of the apparatus;
      a multicast transmitter address field specifying a MAC address of the transmitter of the multicast digital message;
      a multicast clear-to-send slot number field specifying transmission time slots in a contention period useful by the apparatus to send a positive reply signal; and
      a multicast not clear-to-send slot number field specifying transmission time slots in a contention period useful by the apparatus to send a negative reply signal; and
   a transmitter transmitting either a clear to send message or a not clear to send message by utilizing the transmission time slots in a contention period to send the positive reply signal or the transmission time slots in a contention period to send the negative reply signal respectively in response to the received multicast digital message; and
   a processor that resets a network allocation vector of the apparatus when no transmission on the channel is received in a time interval T between times T1 and T2, wherein the time T1 occurs at a time comprising a sum of:
      a time interval for receiving the multicast digital message;
      a time interval for transmission of the clear to send message multiplied by a number of clear to send message slots;
      a time interval for transmission of the not clear to send message multiplied by a number of not clear to send message slots; and
      a time interval for interframe guard intervals; and
   wherein the time T2 occurs at the time T1 added to a wait time.

2. The apparatus of claim 1, wherein the multicast digital message comprises a multicast request-to-send message to reserve time in a communication medium to receive multicast data.

3. The apparatus of claim 1, wherein the multicast clear-to-send slot number field defines a number of time intervals for responding to the multicast digital message.

4. The apparatus of claim 1, wherein the multicast not-clear-to-send slot number field defines a number of time intervals for responding to the multicast digital message.

5. The apparatus of claim 1, the multicast digital message further comprising a frame control field, herein the frame control field comprises a frame type identification.

6. A non-transitory computer program storage device containing computer instructions which, when executed in an apparatus that operates on a channel in a wireless communications medium, enable processing of a multicast digital message, the mutlicast digital message having a format comprising:
   a duration field specifying a time period for which a transmitter desires to reserve the medium;
   a multicast receiver address field specifying a multicast medium access control ("MAC") address of the apparatus;
   a multicast transmitter address field specifying a multicast medium access control ("MAC") address of the transmitter of the multicast message;
   a multicast clear-to-send slot number field specifying transmission time slots in a contention period useful by the apparatus to send a positive reply signal; and
   a multicast not-clear-to-send slot number field specifying transmission time slots in a contention period useful by the apparatus to send a negative reply signal;
   wherein the apparatus responds to the received multicast digital message by transmitting on the channel either a clear to send message or a not clear to send message by utilizing the transmission time slots in a contention period to send the positive reply signal or the transmission time slots in a contention period to send the negative reply signal respectively;
   wherein a network allocation vector of the apparatus is reset when no transmission on the channel is received in a time interval T between times T1 and T2, wherein the time T1 occurs at a time comprising a sum of:
      a time interval for receiving the multicast digital message;
      a time interval for transmission of the clear to send message multiplied by a number of clear to send message slots;
      a time interval for transmission of the not clear to send message multiplied by a number of not clear to send message slots; and
      a time interval for interframe guard intervals; and
   wherein the time T2 occurs at the time T1 added to a wait time.

7. The storage device of claim 6, wherein the multicast digital message comprises a multicast request-to-send message to reserve time in a communication medium to receive multicast data.

8. The storage device of claim 6, wherein the multicast clear-to-send slot number field defines a number of time intervals for responding to the multicast digital message.

9. The storage device of claim 6, wherein the multicast not-clear-to-send slot number field defines a number of time intervals for responding to the multicast digital message.

10. The storage device of claim 6, the multicast digital message further comprising a frame control field, wherein the frame control field comprises a frame type identification.

11. An apparatus that receives a multicast digital message while operating on a channel in a wireless communication medium, the apparatus comprising:
   a receiver receiving the multicast digital message from a transmitter on the channel in the medium, the multicast digital message having a format comprising:
      a duration field specifying a time period for which the transmitter desires to reserve the medium;
      a multicast receiver address field specifying a multicast medium access control ("MAC") address of the apparatus;
      a multicast transmitter address field specifying a MAC address of the transmitter of the multicast message;
      a multicast clear-to-send slot number field specifying transmission time slots in a contention period useful by the apparatus to send a positive reply signal; and
      a multicast not clear-to-send slot number field specifying transmission time slots in a contention period useful by the apparatus to send a negative reply signal; and
   a processor that responds to the received multicast digital message by using a transmitter to transmit on the channel a clear to send message by utilizing the transmission time slots in a contention period to send the positive reply signal; and
   wherein the processor further acts to transmit a cancel clear to send message on the channel when no transmission on the channel is received in a time interval T between times T1 and T2, wherein the time T1 occurs at a time comprising a sum of:
      a time interval for receiving the multicast digital message;
      a time interval for transmission of the clear to send message multiplied by a number of clear to send message slots;
      a time interval for transmission of the not clear to send message multiplied by a number of not clear to send message slots; and
      a time interval for interframe guard intervals; and
   wherein the time T2 occurs at the time T1 added to a wait time.

12. A non-transitory computer program storage device containing computer instructions which, when executed in an apparatus that operates on a channel in a wireless communications medium, enable processing of a multicast digital message, the multicast digital message having a format comprising:
   a duration field specifying a time period for which a transmitter desires to reserve the medium;
   a multicast receiver address field specifying a multicast medium access control ("MAC") address of the apparatus;
   a multicast transmitter address field specifying a multicast medium access control ("MAC") address of the transmitter of the multicast digital message;
   a multicast clear-to-send slot number field specifying transmission time slots in a contention period useful by the apparatus to send a positive reply signal;
   a multicast not clear-to-send slot number field specifying transmission time slots in a contention period useful by the apparatus to send a negative reply signal; and
   wherein the apparatus responds to the received multicast digital message by transmitting on the channel a clear to send message by utilizing the transmission time slots in a contention period to send the positive reply signal;

wherein a cancel clear to send message is transmitted on the channel when no transmission on the channel is received in a time interval T between times T1 and T2, wherein the time T1 occurs at a time comprising a sum of:
- a time interval for receiving the multicast digital message;
- a time interval for transmission of the clear to send message multiplied by a number of clear to send message slots;
- a time interval for transmission of the not clear to send message multiplied by a number of not clear to send message slots; and
- a time interval for interframe guard intervals; and wherein the time T2 occurs at the time T1 added to a wait time.

* * * * *